United States Patent [19]

Tsuyoshi et al.

[11] Patent Number: 4,872,152
[45] Date of Patent: Oct. 3, 1989

[54] LIGHT SPOT POSITION CONTROL SYSTEM AND METHOD BY SAMPLED SERVO

[75] Inventors: Toshiaki Tsuyoshi, Kokubunji; Masatoshi Ohtake, Ome; Wasao Takasugi, Higashiyamato; Seiji Yonezawa, Hachioji, all of Japan

[73] Assignee: Hitachi, Ltd., Tokyo, Japan

[21] Appl. No.: 131,643

[22] Filed: Dec. 11, 1987

[30] Foreign Application Priority Data

Dec. 19, 1986 [JP] Japan ................................ 61-301250

[51] Int. Cl.$^4$ ............................................... G11B 7/00
[52] U.S. Cl. ........................................ 369/44; 369/46; 369/124
[58] Field of Search ...................... 369/44, 46, 45, 47, 369/106, 124, 128

[56] References Cited

U.S. PATENT DOCUMENTS

| | | | |
|---|---|---|---|
| 4,138,741 | 2/1979 | Hedlund et al. | 369/44 |
| 4,344,165 | 8/1982 | Akiyama | 369/124 |
| 4,364,118 | 12/1982 | Maeda et al. | 369/44 |
| 4,443,870 | 4/1984 | Hazel et al. | 369/44 |
| 4,710,909 | 12/1987 | Tsuyoshi et al. | 369/46 |
| 4,750,163 | 6/1988 | Yamamiya et al. | 369/46 |

OTHER PUBLICATIONS

SPIE, *Sector Servo Data File Optical Disk Memory*, Yonezawa et al, 1985, vol. 529, pp. 84–88.
*Servo and Clock Sampling in the Optimem 1000*, Miller, SPIE, 1985, vol. 529, pp. 140–144.

*Primary Examiner*—Steven L. Stephan
*Attorney, Agent, or Firm*—Antonelli, Terry & Wands

[57] ABSTRACT

In a light spot position control system and method in which a control of the irradiation position of a light spot such as a focusing control, a jitter correction and/or a tracking control is made through a sampling control, a newly sampled error value is compared with a one-preceding sampled value. When a difference between both the values is within a range of a predetermined width, the newly sampled value is used as a new sample value as it is. When the difference exceeds the range of the predetermined width, a sum of the one-preceding sampled value and the predetermined width is used as a new sample value. Thereby, the influence of erroneous samples is reduced.

8 Claims, 7 Drawing Sheets

LIGHT SPOT POSITION CONTROL SYSTEM AND METHOD BY SAMPLED SERVO

BACKGROUND OF THE INVENTION

The present invention relates to a light spot position control system and method in which a position control such as a focusing control, a tracking control and/or a jitter correction of a light spot focused onto a recording medium is executed by servo signals (or error signals) derived as sampled signals from servo areas intermittently provided in the recording medium, and more particularly to such a system and method suitable for use in an optical information recording and reproducing apparatus such as an optical disk apparatus or an optical tape apparatus.

In an optical disk memory apparatus, a position control of a light spot such as a focusing control, a tracking control and/or a jitter correction is necessary in order to correctly record and reproduce data. In an optical disk apparatus put into practical use at the present time, a continuous control method has been employed for such a position control. The continuous control method is one in which for example, in the case of the tracking control, an error signal derived from a guide groove or pre-groove provided on the disk along the direction of rotation of the disk (or the direction of a track) is always detected and this error signal is continuously supplied to a control system to perform a desired control.

Recently, on the other hand, attention is directed to a method in which a control by sample values is carried out for performing the tracking control and/or the focusing control. A sampling control in an optical disk apparatus is disclosed by "Optical Mass Data Storage", SPIE Vol 529, pp. 85-88 and 140-144 (1985), U.S. Pat. No. 4,364,118 and U.S. Pat. No. 4,443,870.

In many cases of the sampling control in the optical disk apparatus, 1000 to 3000 servo areas (sample points) for obtaining servo signals for the focusing or tracking control are intermittently provided in one track round of the disk, data areas are provided between the servo areas, and the length of each servo area is not larger than 10% of that of each data area. Great merits of the use of the sampling value control in the optical disk apparatus are that since the data and servo areas are separated in terms of time and space, there is no fear that a servo system is disturbed by a modulated light of strong intensity during the recording of data and that the servo system encounters no influence of gain variation due to a change of reflectivity of the disk before and after the recording of data pit, etc.

A problem in the case of carrying out the sample value control is a measure to counter the case where some of the servo areas are destroyed by defects or the like of the disk and hence a correct error signal cannot be sampled or detected from the servo area. In the case of the continuous control, since an error signal is continuously obtained, for example, the influence of minute defects existing in the guide grooves can be reduced to a certain extent by averaging the error signal by means of a low pass filter or the like. On the other hand, in the case of the sample value control, since each sample point represents an error signal of servo areas before and after that sample point, the presence of an error in an error signal obtained from the sample point is equivalent to the presence of an error in the servo areas before and after that sample point. In the sample value control, it is general that the number of sample points is by nature selected to a minimum within a range in which the control system stably operates. Therefore, to eliminate the above-mentioned error in a sample value by a low pass filter is difficult as compared with the case of the continuous control. Accordingly, the sample value control has a problem that the influence of erroneous samples is liable to become large as compared with the continuous control.

As a countermeasure of the erroneous samples, the present inventors have proposed a tracking control in which reproduction signals from pits wobbled in the same direction between two adjacent servo areas are differentially detected to determine the normal or abnormal of the wobble pits in accordance with the normal or abnormal of the detected differential output and the use of a tracking signal detected is stopped immediately upon detection of the abnormal wobble pits so that a correct tracking signal detected at a one-preceding sample point is used (see U.S. Ser. No. 71,347 filed on Jul. 9, 1987 in the name of Wasao Takasugi et al). The proposed tracking control is characterized in that the abnormal of each wobble pit itself is monitored rather than the detection of the abnormal of a tracking signal detected from pits wobbled right and left.

The present inventors have further proposed a light spot position control system in which whether or not the latest sample value detected from servo areas intermittently provided falls within an allowable deviation range is checked, and if it is out of the allowable deviation range, the sample value decided to be normal or correct at a one-preceding sample point is used as it is or a prediction value obtained by use of a curve derived from a plurality of previous sample values by a least square method or a prediction value obtained from the previous sample values by a linear prediction method is used (see U.S. Ser. No. 72,095 filed on Jul. 10, 1987 in the name of Masatoshi Ohtake et al., now U.S. Pat. No. 4,785,442).

SUMMARY OF THE INVENTION

An object of the present invention is to provide a light spot position control system and method using a sampling control for a position control such as a tracking control, a focusing control and/or a jitter correction in an optical disk, in which a servo system can be prevented from being disturbed by erroneous samples produced due to defects of the disk, etc. and the circuit construction can be easily made and is suitable for an IC configuration.

A feature of the present invention lies in that the amount of change of error signals sampled and detected from servo areas of a recording medium which has an alternate arrangement of servo areas and data areas along a track and is irradiated with a light spot, is limited to fall within a predetermined range. More especially, an error sample value obtained at a certain sample point is compared with that obtained at a one-preceding sample point. If a difference between both the sample values is in the predetermined range or window range, the sample value at the certain sample point is regarded as being a correct value and is used as it is. On the other hand, if the difference exceeds the window range, a value saturated with the window range or a sum of the one-preceding sample value and the window range is used as a sample value at the certain sample point.

BRIEF DESCRIPTION OF THE DRAWINGS

FIGS. 5 A-D are a time charts for explaining the operation of the embodiment shown in FIG. 4;

DESCRIPTION OF THE PREFERRED EMBODIMENTS

Figure 1:
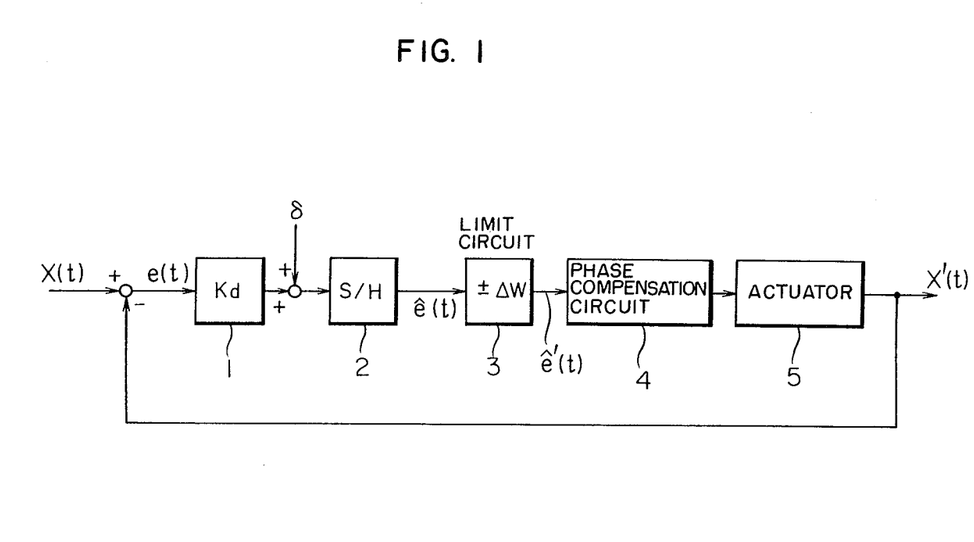
FIG. 1 is a block diagram of an embodiment of a light spot position control system according to the present invention.

FIG. 1 shows a block diagram of an embodiment of a light spot position control system according to the present invention in which a limiter circuit 3 characteristic of the present invention and with a window width or range of $\Delta W$ is additionally provided in a sampled value control system. When such a control system is used as a tracking control system, an input $X(t)$ assumes the deviation of a track in the radius direction of an optical disk resulting from the eccentricity of the disk, etc. and an output $X'(t)$ assumes the deviation of a light spot (from an equilibrium or balance point of an actuator 5). A difference $e(t)$ between $X(t)$ and $X'(t)$ is a servo error and the control system operates so that $e(t)$ becomes zero. The servo error is converted into an electrical quantity by an error detector 1. Before and/or after this conversion, a noise $\delta$ may be introduced. The reduction of any influence of this noise is purposed by the present invention. A servo error which can be generally measured in the sampled value control system is $\hat{e}(t)$. The servo error $\hat{e}(t)$ is obtained by a sample/hold circuit 2 for sampling and holding an output of the error detector 1. $\hat{e}(t)$ sometimes involves the noise $\delta$. In the present invention, the influence of the noise $\delta$ is reduced by the provision of the limiter circuit 3. An output $\hat{e}'(t)$ of the limiter circuit 3 is a substantial servo error applied to the control system and it drives the actuator 5 through a phase compensation circuit 4.

The operation of the limiter circuit 3 will now be explained by virtue of FIGS. 2A and 2B.

Figure 2A:
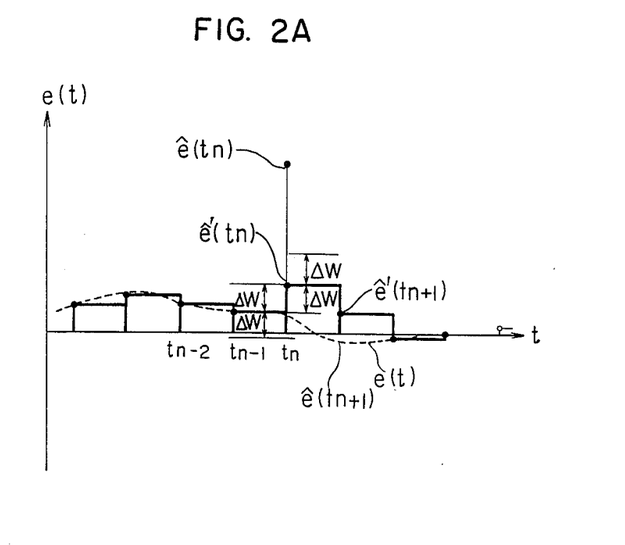
FIG. 2A is a view for explaining the operation of the system shown in FIG. 1.
Figure 2B:
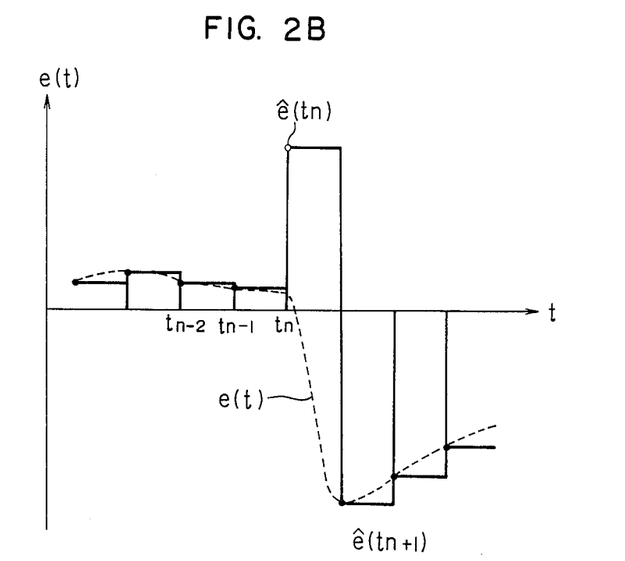
FIG. 2B is a view for explaining the operation of a servo system which has no limiter circuit.

FIG. 2B shows a change of the servo error when the limiter circuit 3 is not used. If a noise $\delta$ is applied at time instant $t=t_n$ and for only one sample period and it is introduced as $\hat{e}(t_n)$ into the system after the sample and hold thereof, a light spot moves in the direction of a polarity reverse to that of the noise in response to the noise, as shown by dotted line $e(t)$, to generate a great servo error, thereby deteriorating the controllability. For example, in the case of a tracking control, if this servo error exceeds 0.1 $\mu$m, normal or correct recording or reproduction of data is difficult.

FIG. 2A illustrates the operation of a servo system in which the limiter circuit 3 characteristic of the present invention and with the window width or range of $\Delta W$ is additionally provided. The limiter circuit 3 compares the present or newly held value $\hat{e}(t_n)$ with a one-preceding output value $\hat{e}'(t_{n-1})$. If a difference between both the values falls within $\Delta W$, the limiter circuit 3 outputs $\hat{e}'(t_n) = \hat{e}(t_n)$. If the difference has a relation of $$|\hat{e}(t_n) - \hat{e}'(t_{n-1})| > \Delta W \tag{1}$$

the limiter circuit 3 produces the following output:

$$\hat{e}'(t_n) = \hat{e}'(t_{n-1}) + \text{\textcircled{S}} \cdot \Delta W \tag{2}$$

Here, $\text{\textcircled{S}}$ is $+1$ in the case of $\hat{e}(t_n) \geq \hat{e}'(t_{n-1})$ and $-1$ in the case of $\hat{e}(t_n) < \hat{e}'(t_{n-1})$. In other words, the limit circuit 3 has a function of limiting the present output value to be in the width of $\pm \Delta W$ centering the one-preceding output value. In an example shown in FIG. 2A, $\hat{e}(t_n)$ involving a noise at a sample point $t = t_n$ is inputted to the limiter circuit 3 but it is limited with $\Delta W$ by the limiter circuit 3. Since the output $\hat{e}'(t)$ of the limiter circuit 3 may include a noise component which cannot be eliminated by the window $\Delta W$, a light spot may move in the direction of a polarity reverse to that of the noise. However, the amount of movement of the light spot can be made small as compared with the case where no limiter circuit is provided. If the above relation (1) in terms of $n \rightarrow n+1$ is satisfied also at the next sample point $t - t_{n+1}$, the limiter circuit 3 operates in accordance with the equation (2). Therefore, there may be a case where even if the output $\hat{e}(t_{n+1})$ of the sample and hold circuit 2 represent a correct value, $\hat{e}(t_{n+1})$ is limited with the window $\Delta W$ centering the value of $\hat{e}'(t_n)$, as shown in FIG. 2A, and hence the output $\hat{e}'(t_{n+1})$ of the limiter circuit 3 differs from $\hat{e}(t_{n+1})$. But, this arises no problem since the difference between $\hat{e}'(t_{n+1})$ and $e(t_{n+1})$ can be made small depending on the selection of the value of $\Delta W$ and a difference between values compared by the limiter circuit 3 is astricted after the succeeding one or two period(s) to a value which falls within $\Delta W$.

Thus, the influence of an erroneous sample in the sample value control can be greatly reduced by the additional provision of the limiter circuit 3.

It is preferable that the value of $\Delta W$ is determined calculating the amount of error changeable during one sample period under consideration of an external disturbance applied to the system, etc. In the case where $\Delta W$ is set to a too large value, the system is liable to be affected by noises. On the other hand, in the case where $\Delta W$ is set to a too small value, a correct servo error is liable to be eliminated. Accordingly, it is necessary to set $\Delta W$ to an optimum value between both the cases.

Figure 3A:
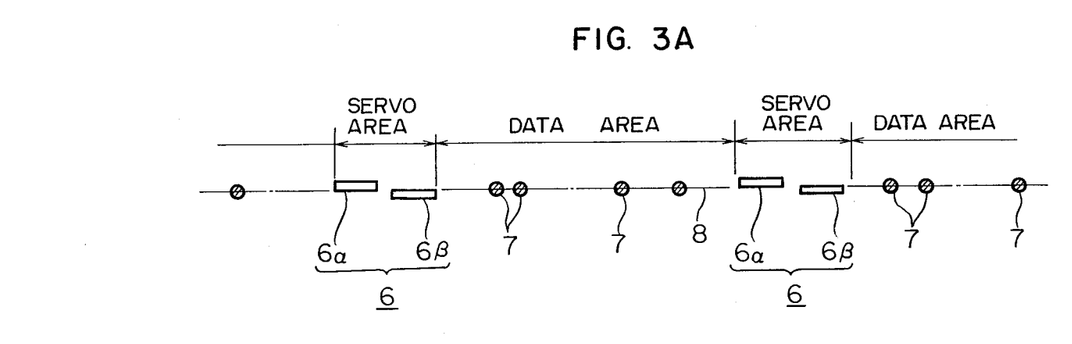
FIG. 3A shows an example of the structure of a track provided in a recording medium which is used in the present invention.
Figure 3B:
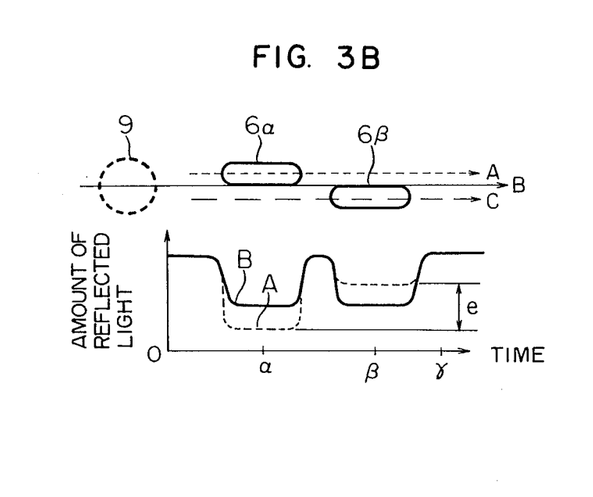
FIG. 3B is a view for explaining the operation of detection of a prewobbling tracking error.
Figure 4:
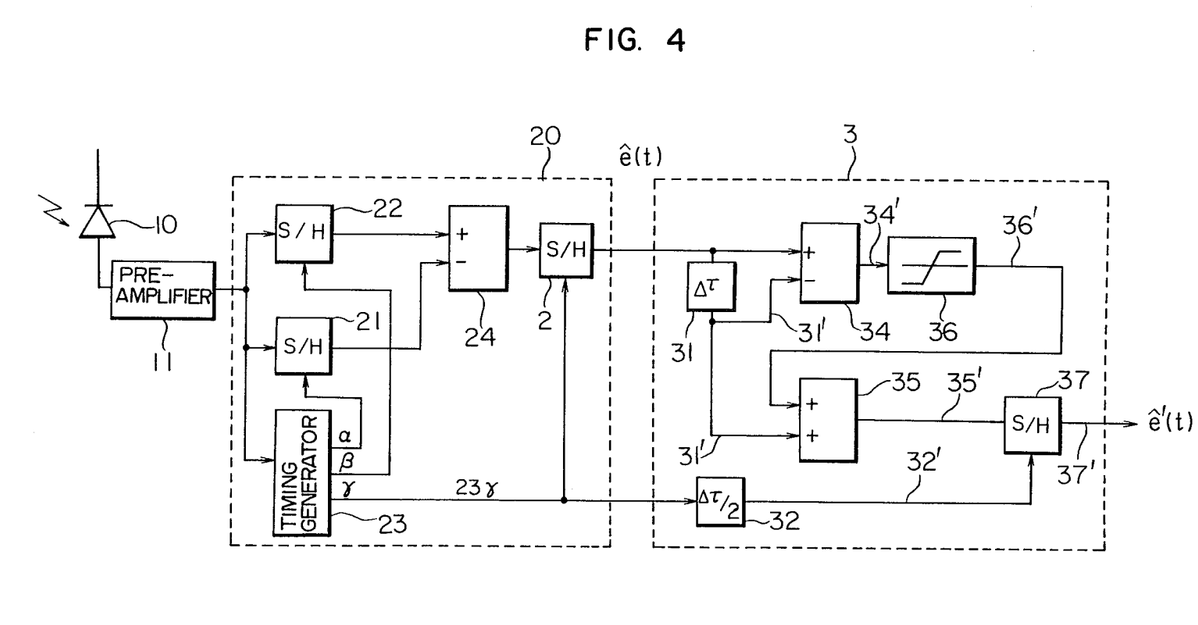
FIG. 4 shows a block diagram of an embodiment in which the present invention is used for the detection of a tracking error in a prewobbling manner, the figure also showing an example of the construction of a limiter circuit used in the present invention.

FIG. 4 shows a block diagram of an embodiment in which the present invention is applied to a tracking control in a prewobbling manner. Referring to FIG. 4, a block 20 enclosed by dotted line is a prewobbling tracking error detection circuit which corresponds to a portion of the system of FIG. 1 including the error detector 1 and the sample and hold circuit 2. The limiter circuit characteristic of the present invention is a block 3 enclosed by dotted line. First, the principle of the prewobbling tracking error detection will be explained by use of FIGS. 3A and 3B in order to assist the understanding of the present embodiment. FIG. 3A shows the structure of a track which is used for a sampled value control type of prewobbling tracking control. The track provided on a disk includes servo areas 6 and data areas 7 which are alternately arranged at a constant time interval. A servo signal is detected from the servo area 6, and the recording and reproduction of data pits which are user data are made in the data area. The servo area 6 is provided with servo marks fit for the purpose. For example, for the purpose of the prewobbling tracking control, there are provided wobble marks 6 which are pits $6\alpha$ and $6\beta$ arranged with the same amount of wobble with respect to the center 8 of the track. For the purpose of a focusing control, a mirror region is provided. Explanation of the case of the tracking control will be made hereinafter.

FIG. 3B is a view showing the principle of detection of a tracking error. When a light spot 9 passes on the wobble marks along a trace indicated by an arrow B or correctly traces the track center 8, the overlapping areas of the light spot 9 with the pits $6\alpha$ and $6\beta$ are equal to each other. Therefore, the amount of a reflected light from the disk obtained by a light detector 10 shown in FIG. 4 has equal values for the pits $6\alpha$ and $6\beta$, as shown by solid line B in FIG. 3B. However, in the case where the light spot 9 passes along a trace biased to the side of the pit $6\alpha$, as indicated by an arrow A, the reflected light amount changes as shown by dotted line A. Namely, the reflected light amount when the light spot 9 passes the pit $6\alpha$ is less than that when it passes the pit $6\beta$, and hence a difference e appears between the reflected light amounts from the pits $6\alpha$ and $6\beta$. On the other hand, in the case where the light spot 9 passes along a trace indicated by an arrow C, the sign of the difference e between the reflected light amount from the pits $6\alpha$ and $6\beta$ is opposite to that in the above-mentioned case. Accordingly, by sampling and holding the deflected light amounts from the wobble marks $6\alpha$ and $6\beta$ at points $\alpha$ and $\beta$ on the time base respectively and producing a difference therebetween at time instant $\gamma$, a tracking error signal $\hat{e}(t)$ sampled and detected is obtained. The above is the principle of detection of the tracking error in the prewobbling method. In the block 20 shown in FIG. 4, a signal from a pre-amplifier 11 is sampled and held by sample and hold circuits 21 and 22 at timings $\alpha$ and $\beta$ generated by a timing generator 23, a difference between outputs of the sample and hold circuits 21 and 22 is produced by a differential circuit 24 an output of which is in turn held by the sample and hold circuit 2 at a timing $\gamma$ generated by the timing generator 23 to produce a tracking signal $\hat{e}(t)$.

An example of the limiter circuit 3 characteristic of the present invention is constructed by a differential circuit 34, a saturation circuit 36, a sample and hold circuit 37, an adder circuit 35, and delay circuits 31 and 32 which provide times $\Delta\tau$ and $\Delta\tau/2$ used for synchronizing timings of samples. Here, $\Delta\tau$ is selected to be sufficiently shorter than the sampling period, i.e. the period of pulses $\gamma$.

Figure 5:
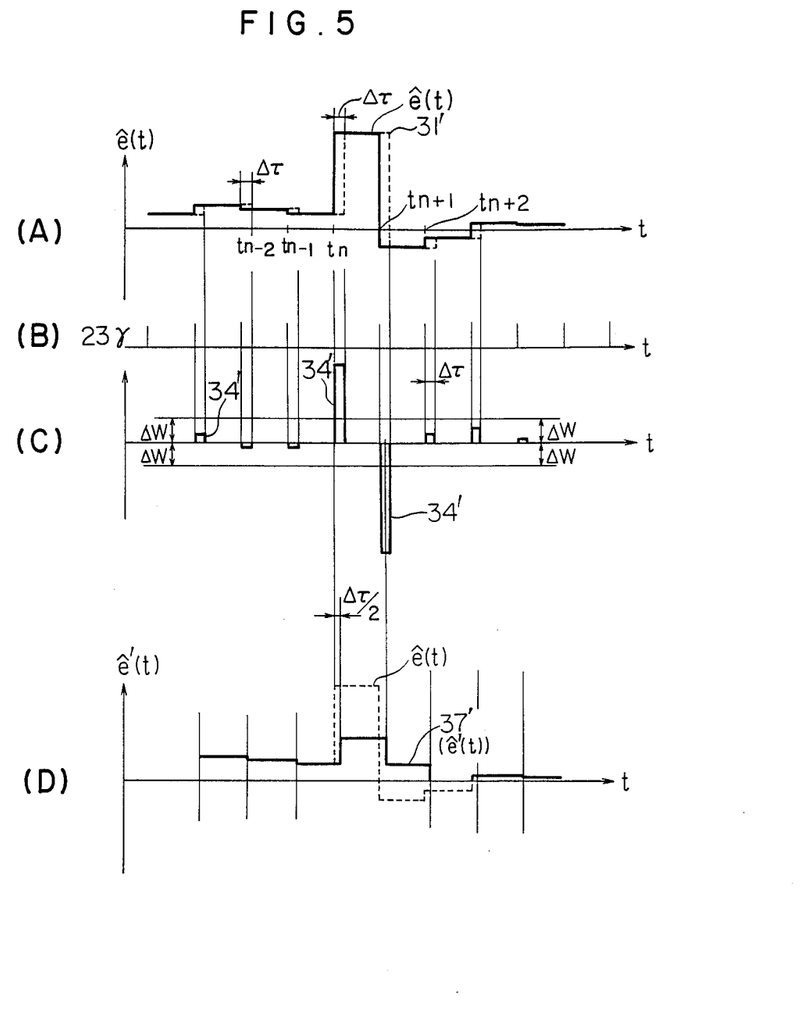

Next, the operation of the limiter circuit 3 will be explained by use of a time chart shown in FIG. 5. (A) of FIG. 5 shows a change of $\hat{e}(t)$ (tracking error signal in the shown example) which is an input to the limiter circuit 3. (B) of FIG. 5 shows a control signal $23\gamma$ used for controlling the sample and hold circuit 2. A difference between the input $\hat{e}(t)$ (shown by solid line in (A) of FIG. 5) and a signal $31'$ (shown by dotted line in (A) of FIG. 5) obtained by delaying the $\hat{e}(t)$ through the delay circuit 31 by $\Delta\tau$ is produced by the differential circuit 34 so that the amount $34'$ of change in the input $\hat{e}(t)$ during one sample period is detected. This situation is illustrated by (C) of FIG. 5. According to the present invention, when the change amount $34'$ during one sample period exceeds a constant value $\Delta W$, the sample is decided to be an erroneous sample and the change amount $34'$ is limited to $\Delta W$ in accordance with the above-mentioned equation (2). For this purpose, the output $34'$ of the differential circuit 34 is saturated by the saturation circuit 36 having a window width of $\Delta W$. An output $36'$ of the saturation circuit 36 and the signal $31'$ obtained by delaying $\hat{e}(t)$ by $\Delta\tau$ are inputted to the adder circuit 35 to produce a signal $35'$ representative of a sum thereof. This sum signal $35'$ is sampled and held in the sample and hold circuit 37 by means of a signal $32'$ obtained by delaying the timing signal $23\gamma$ through the delay circuit 32 by $\Delta\tau/2$ thereby providing an error signal $\hat{e}'(t)$ in which the amount of change between the adjacent samples is limited to $\pm\Delta W$. In (D) of FIG. 5, a solid line represents $\hat{e}'(t)$ or the output $37'$ of the limiter circuit 3 and a dotted line represents the input $\hat{e}(t)$ thereof. FIG. 5 illustrates the operation in the case where a large noise is introduced into the input $\hat{e}(t_n)$ at $t=t_n$.

Figure 6A:
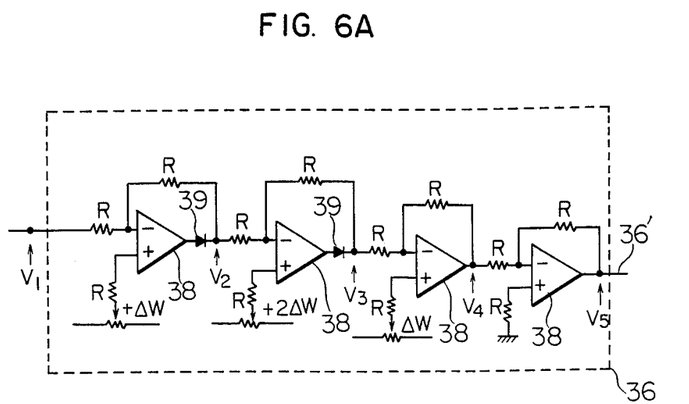
FIG. 6A shows an example of the construction of a saturation circuit.
Figure 6B:
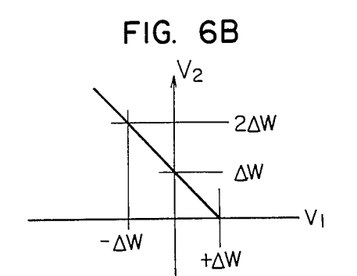
FIGS. 6B to 6E are views for explaining the operation of the circuit shown in FIG. 6A.
Figure 6C:
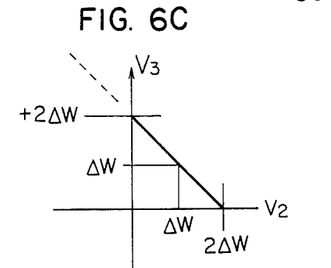
Figure 6D:
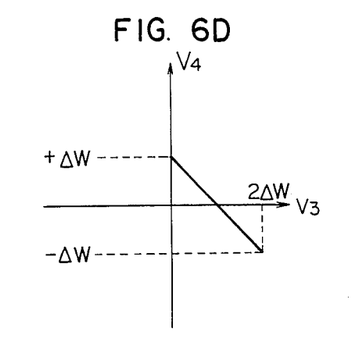
Figure 6E:
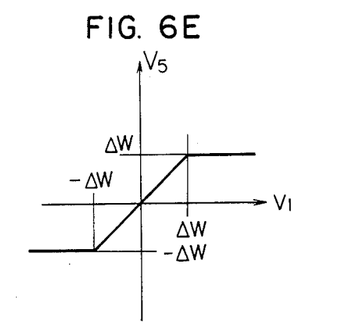

FIG. 6A is a block diagram showing an example of the construction of the saturation circuit 36. A portion enclosed by dotted line represents the saturation circuit. This circuit including four operational amplifiers 38. The input to output characteristics of the first and second stage operational amplifiers are shown in FIGS. 6B and 6C, respectively. At the first stage, an input having a value not smaller than $+\Delta W$ is saturated by a diode 39, and at the second stage, an input having a value not larger than $-\Delta W$ is saturated. Since the output of the second stage has an operating point of $+\Delta W$, the operating point is returned to the center or zero at the third stage. This situation is shown in FIG. 6D. The last stage is used for inverting the polarity. The ultimate relation between the input and output of the saturation circuit 36 is shown in FIG. 6E. With the shown circuit construction, the saturation circuit 36 of $\pm\Delta W$ can be easily realized.

In the limiter circuit 3 used in the abovedescribed embodiment, the signal is processed in an analog fashion. Alternatively, the signal can be processed in a digital fashion.

Figure 7:
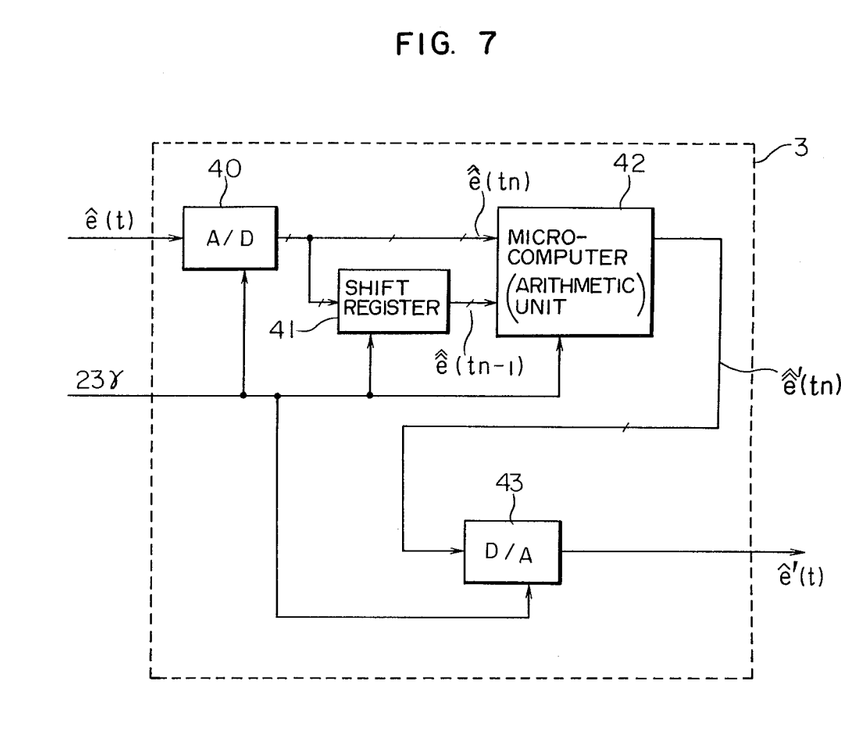
FIG. 7 shows another example of the construction of a limiter circuit used in the present invention.

FIG. 7 is a block diagram showing an example of the construction of the limiter circuit 3 for the signal processing in the digital fashion. The output $\hat{e}(t)$ of the sample and hold circuit 2 is digitalized by an A/D converter 40 and the digital signal is inputted to a shift register 41 to obtain data at a one-preceding sample point. The present sample date $\hat{e}(t_n)$ and the one-preceding sample data $\hat{e}(t_{n-1})$ are inputted to a microcomputer (arithmetic or operation unit) 42. In the microcomputer 42, a difference between both the data is produced, and if the difference exceeds $\Delta W$, a calculation for limiting it to $\Delta W$ is performed to deliver an output $\hat{e}'(t_n)$ as a numerical signal. Finally, this signal is converted by a D/A converter 43 to provide an analog error signal $\hat{e}'(t)$. The function of the shift register 41 shown in the present example can be easily realized in the microcomputer 42. Therefore, it does not always follow that it is necessary to provide the shift register separately from the microcomputer. In general, since the servo band of a servo system in an optical disk is in the order of 3 KHz in many cases, a simple calculation of addition and subtraction as in the present invention can be sufficiently performed by the microcomputer with a high accuracy of calculation.

The foregoing embodiment has been described in conjunction with the case of the tracking control. However, it is needless to say that the present invention is similarly applicable to a focusing control, a jitter correction and a PLL control.

According to the present invention, the influence of noises such as erroneous samples can be greatly reduced. Also, the circuit construction can be easily made and it is suitable for an IC configuration.

We claim:

1. A light spot position control system comprising:
   error detection means for irradiating with a light spot a recording medium having servo areas and data areas alternately provided along a track and for sampling and detecting error signals from light obtained from the servo areas;
   limiter means coupled with said, error detection means for limiting the amount of change between successive sampled and detected error signals to fall within a predetermined range, thereby outputting a limited error signal; and
   a position control mechanism for controlling a position of said light spot on the basis of an output of said limiter means.

2. A light spot position control system according to claim 1, wherein said limiter means compares a value of the newly sampled and detected error signal with a value of one-preceding sampled and detected error signal to output a signal representative of the value of the newly sampled and detected error signal when a difference between the value of the newly sampled and detected error signal and the value of the one-preceding sampled and detected error signal is in said predetermined range and a signal representative of a sum of the one-preceding sampled and detected error signal value and a predetermined value when said difference exceeds said predetermined range.

3. A light spot position control system according to claim 1, wherein said limiter means includes a first means coupled with said error detection means for outputting a value of a one-preceding sampled and detected error signal, a second means coupled with said first means and said error detection means for producing a difference between an output of said first means and an output of said error detection means, a third means for limiting said difference to said predetermined range, and a fourth means for adding an output of said third means and the value of the one-preceding sampled and detected error signal.

4. A light spot position control system according to claim 1, wherein said limiter means includes a first means coupled with said error detection means for digitalizing the samples and detected error signal, a second means coupled with said first means for comparing a digital value of the newly sampled and detected error signal with a digital value of a one-preceding sampled and detected error signal to output the digital value of the newly sampled and detected error signal when a difference between the digital value of the newly sampled and detected error signal and the digital value of the one-preceding sampled and detected error signal is in said predetermined range and a sum of the digital value of the one-preceding sampled and detected error signal and a predetermined value when said difference exceeds said predetermined range, and a third means for converting an output of said second means into an analog signal.

5. A light spot position control system according to claim 3, wherein said first means includes a delay circuit.

6. A light spot position control system according to claim 4, wherein said second means includes a microcomputer.

7. A light spot position control method comprising:
   a step of irradiating with a light spot a recording medium in which servo areas and data areas are alternately provided along a track and for servo areas; sampling and detecting error signals from light obtained from said servo areas;
   a step of limiting the amount of change between successive sampled and detected error signals to fall within a predetermined range, thereby producing a limited error signal; and
   a step of controlling a position of said light spot on the basis of said limited error signal.

8. A light spot position control method according to claim 7, wherein at the limiting step, a value of the newly sampled and detected error signal is compared with a value of a one-preceding sampled and detected error signal, and a signal representative of the value of the newly sampled and detected error signal is outputted when a difference between the value of the newly sampled and detected error signal and the value of the one-preceding sampled and detected error signal is in said predetermined range while a signal representative of a sum of the value of the one-preceding sampled and detected error signal and a predetermined value is outputted when said difference exceeds said predetermined range, whereby said amount of change of the sampled and detected error signals is limited to fall within said predetermined range.

* * * * *